(12) United States Patent
Kuppan et al.

(10) Patent No.: US 11,788,537 B2
(45) Date of Patent: Oct. 17, 2023

(54) DUAL SYSTEM ELECTRIC POWERED ASPIRATORS

(71) Applicant: GOODRICH CORPORATION, Charlotte, NC (US)

(72) Inventors: Skandan Berikai Kuppan, Bangalore (IN); Jeffrey Martin Werbelow, Phoenix, AZ (US)

(73) Assignee: GOODRICH CORPORATION, Charlotte, NC (US)

( * ) Notice: Subject to any disclaimer, the term of this patent is extended or adjusted under 35 U.S.C. 154(b) by 371 days.

(21) Appl. No.: 17/134,001

(22) Filed: Dec. 24, 2020

(65) Prior Publication Data

US 2022/0082105 A1 Mar. 17, 2022

(30) Foreign Application Priority Data

Sep. 12, 2020 (IN) .............................. 202041039522

(51) Int. Cl.
*F04D 25/16* (2006.01)
*F04D 27/00* (2006.01)
*F04D 25/08* (2006.01)

(52) U.S. Cl.
CPC ........... *F04D 25/16* (2013.01); *F04D 25/084* (2013.01); *F04D 27/00* (2013.01)

(58) Field of Classification Search
CPC ................................ F04D 25/16; F04D 25/166
See application file for complete search history.

(56) References Cited

U.S. PATENT DOCUMENTS

| | | | |
|---|---|---|---|
| 2,980,117 A * | 4/1961 | De Saedeleer | A24B 3/02 131/302 |
| 3,460,746 A * | 8/1969 | Green | F04F 5/466 417/174 |
| 3,468,472 A | 9/1969 | Hahn | |
| 3,904,324 A * | 9/1975 | Flatt | F04D 25/045 416/220 A |
| 4,375,877 A * | 3/1983 | Shorey | B64D 25/14 193/25 B |
| 4,671,744 A | 6/1987 | Shaffer et al. | |
| 5,738,305 A | 4/1998 | Pruitt | |
| 6,296,459 B1 | 10/2001 | Saputo et al. | |
| 6,591,873 B1 | 7/2003 | McNeil | |
| 9,637,210 B2 | 5/2017 | Thomson | |

FOREIGN PATENT DOCUMENTS

| | | |
|---|---|---|
| EP | 0034357 | 8/1981 |
| FR | 2343199 | 9/1977 |
| WO | 8302981 | 9/1983 |
| WO | 2016061446 | 4/2016 |

OTHER PUBLICATIONS

European Patent Office; Extended European Search Report dated Jan. 31, 2022 in Application No. 21196349.1.

* cited by examiner

*Primary Examiner* — Brian O Peters
(74) *Attorney, Agent, or Firm* — SNELL & WILMER L.L.P.

(57) ABSTRACT

A system for inflating an inflatable device includes a ducted fan aspirator coupled to the inflatable device and having a fan and a fan motor configured to drive the fan to direct first air into the inflatable device. The system further includes a compressor aspirator coupled to the inflatable device and having a compressor and a compressor motor configured to drive the compressor to direct second air into the inflatable device.

15 Claims, 7 Drawing Sheets

DUAL SYSTEM ELECTRIC POWERED ASPIRATORS

CROSS-REFERENCE TO RELATED APPLICATIONS

This application is a non-provisional of, and claims priority to, and the benefit of India Provisional Application No. 202041039522 with DAS code D2E7, entitled "A DUAL SYSTEM ELECTRIC POWERED ASPIRATORS," filed on Sep. 12, 2020, which is hereby incorporated by reference in its entirety.

FIELD

The present disclosure is directed to evacuation systems for use in aircraft and, more particularly, to a dual aspirator system for inflating flotation devices and inflation assemblies for evacuation systems.

BACKGROUND

Evacuation systems of aircraft may include an inflatable device, such as an evacuation slide, an aspirator for inflating the inflatable device, and a source of compressed gas (e.g., one or more tank of compressed gas). In response to the evacuation system becoming deployed, the source of compressed gas may release gas through the aspirator, which then also draws air from the environment of the aspirator and inflates the inflatable device using the decompressed gas and the air. However, use of compressed gas storage tanks may be undesirable for various reasons. For example, the storage tanks may undesirably increase a total weight of the aircraft. Additionally, the storage tanks may be difficult to store and transport on board the aircraft.

Thus, there is a need in the art for alternative systems for inflating inflatable devices.

SUMMARY

Described herein is a system for inflating an inflatable device. The system includes a ducted fan aspirator coupled to the inflatable device and having a fan and a fan motor configured to drive the fan to direct first air into the inflatable device. The system further includes a compressor aspirator coupled to the inflatable device and having a compressor and a compressor motor configured to drive the compressor to direct second air into the inflatable device.

In any of the foregoing embodiments, the compressor aspirator further includes a secondary inlet configured to facilitate flow of a third air into the inflatable device in response to the compressor directing the second air into the inflatable device.

In any of the foregoing embodiments, the compressor aspirator further includes: a primary inlet through which the second air flows into the compressor aspirator; a primary flap located proximate to the primary inlet and configured to reduce the likelihood of the second air flowing upstream through the primary inlet; and a secondary flap located proximate to the secondary inlet and configured to reduce the likelihood of the third air flowing upstream through the secondary inlet.

In any of the foregoing embodiments, the compressor aspirator has a longitudinal axis, and the primary inlet is located radially inward relative to the secondary inlet.

In any of the foregoing embodiments, the compressor aspirator further includes: an outlet through which the second air and the third air flow out of the compressor aspirator and into the inflatable device; an outlet chamber in which the second air and the third air mix; a primary outlet downstream from the compressor through which the second air enters the outlet chamber; and a secondary outlet downstream from the secondary inlet through which the third air enters the outlet chamber.

In any of the foregoing embodiments, the ducted fan aspirator further includes: a fan inlet through which the first air flows into the ducted fan aspirator; a fan flap located proximate to the fan inlet and configured to reduce the likelihood of the first air flowing upstream through the fan inlet; a fan outlet downstream from the fan through which the first air flows out of the ducted fan aspirator; and a fan channel extending from the fan inlet to the fan outlet.

In any of the foregoing embodiments: the ducted fan aspirator has a longitudinal axis; the fan is centered along the longitudinal axis; and the fan has a fan radial length that is less than a channel radial length of the fan channel.

In any of the foregoing embodiments, the ducted fan aspirator is configured to direct the first air into the inflatable device during a first time period from a first start time to a first end time, and the compressor aspirator is configured to direct the second air into the inflatable device during a second time period from a second start time that is later than the first start time to a second end time that is later than the first end time.

Any of the foregoing embodiments may further include a controller coupled to the ducted fan aspirator and to the compressor aspirator and configured to control the fan to direct the first air into the inflatable device during the first time period and to control the compressor to direct the second air into the inflatable device during the second time period.

In any of the foregoing embodiments, the controller is further configured to control the fan and the compressor based on an elapsed amount of time since the first start time.

Any of the foregoing embodiments may further include a pressure sensor configured to detect a pressure of device air in the inflatable device, wherein the controller is further configured to control the fan and the compressor based on the pressure of the device air in the inflatable device.

In any of the foregoing embodiments, the fan includes any first fan or first compressor, and the compressor includes any second fan or second compressor.

Also disclosed is a system for inflating an inflatable device. The system includes a ducted fan aspirator coupled to the inflatable device and having a fan and a fan motor configured to drive the fan to direct first air into the inflatable device during a first time period. The system further includes a compressor aspirator coupled to the inflatable device and having: a compressor and a compressor motor configured to drive the compressor to direct second air into the inflatable device via a primary inlet during a second time period that is different than the first time period, and a secondary inlet configured to facilitate flow of a third air into the inflatable device in response to the compressor directing the second air into the inflatable device during the second time period.

In any of the foregoing embodiments, the compressor aspirator further includes: a primary flap located proximate to the primary inlet and configured to reduce the likelihood of the second air flowing upstream through the primary inlet; and a secondary flap located proximate to the secondary inlet and configured to reduce the likelihood of the third air flowing upstream through the secondary inlet.

In any of the foregoing embodiments, the ducted fan aspirator further includes: a fan inlet through which the first air flows into the ducted fan aspirator; a fan flap located proximate to the fan inlet and configured to reduce the likelihood of the first air flowing upstream through the fan inlet; a fan outlet downstream from the fan through which the first air flows out of the ducted fan aspirator; and a fan channel extending from the fan inlet to the fan outlet.

Also disclosed is a method for inflating an inflatable device. The method includes providing, by a ducted fan aspirator, first air into the inflatable device during a first time period from a first start time to a first end time. The method further includes providing, by a compressor aspirator, second air into the inflatable device during a second time period from a second start time to a second end time.

In any of the foregoing embodiments, the second start time is later than the first start time, and the second end time is later than the first end time.

Any of the foregoing embodiments may further include providing, by the compressor aspirator, third air into the inflatable device during the second time period, the third air flowing through a secondary inlet of the compressor aspirator in response to the second air being provided by the compressor aspirator.

Any of the foregoing embodiments may further include controlling, by a controller, the ducted fan aspirator and the compressor aspirator based on an elapsed amount of time since the first start time.

Any of the foregoing embodiments may further include detecting, by a pressure sensor, a pressure of device air in the inflatable device; and controlling, by a controller, the ducted fan aspirator and the compressor aspirator based on the pressure of the device air.

The foregoing features and elements may be combined in various combinations without exclusivity, unless expressly indicated herein otherwise. These features and elements as well as the operation of the disclosed embodiments will become more apparent in light of the following description and accompanying drawings.

BRIEF DESCRIPTION OF THE DRAWINGS

The subject matter of the present disclosure is particularly pointed out and distinctly claimed in the concluding portion of the specification. A more complete understanding of the present disclosures, however, may best be obtained by referring to the detailed description and claims when considered in connection with the drawing figures, wherein like numerals denote like elements.

DETAILED DESCRIPTION

The detailed description of exemplary embodiments herein makes reference to the accompanying drawings, which show exemplary embodiments by way of illustration and their best mode. While these exemplary embodiments are described in sufficient detail to enable those skilled in the art to practice the disclosure, it should be understood that other embodiments may be realized and that logical, chemical, and mechanical changes may be made without departing from the spirit and scope of the disclosure. Thus, the detailed description herein is presented for purposes of illustration only and not of limitation. For example, the steps recited in any of the method or process descriptions may be executed in any order and are not necessarily limited to the order presented. Furthermore, any reference to singular includes plural embodiments, and any reference to more than one component or step may include a singular embodiment or step. Also, any reference to attached, fixed, connected or the like may include permanent, removable, temporary, partial, full and/or any other possible attachment option. Additionally, any reference to without contact (or similar phrases) may also include reduced contact or minimal contact.

Figure 1:
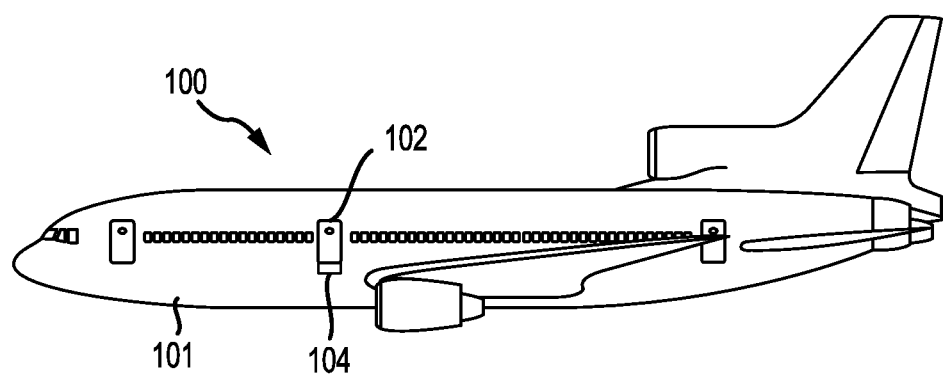
FIG. 1 is a drawing of an aircraft having an exit door and an evacuation system, in accordance with various embodiments.

Referring now to FIG. 1, an aircraft 100 is shown. The aircraft 100 may include a fuselage 101 having a plurality of exit doors including an exit door 102. The aircraft 100 may include one or more evacuation systems positioned near a corresponding exit door or located anywhere in or on the fuselage 101. For example, the aircraft 100 includes an evacuation system 104 positioned near the exit door 102, and may include another evacuation system positioned in the fuselage 101 and designed to inflate outside of the fuselage to provide at least one of egress or flotation. The evacuation system 104 may be removably coupled to the fuselage 101. In the event of an emergency, the exit door 102 may be opened by a passenger or crew member of the aircraft 100. In various embodiments, the evacuation system 104 may deploy in response to the exit door 102 being opened and, in various embodiments, the evacuation system 104 may deploy in response to another action taken by a passenger or crew member such as depression of a button or actuation of a lever.

Figure 2:
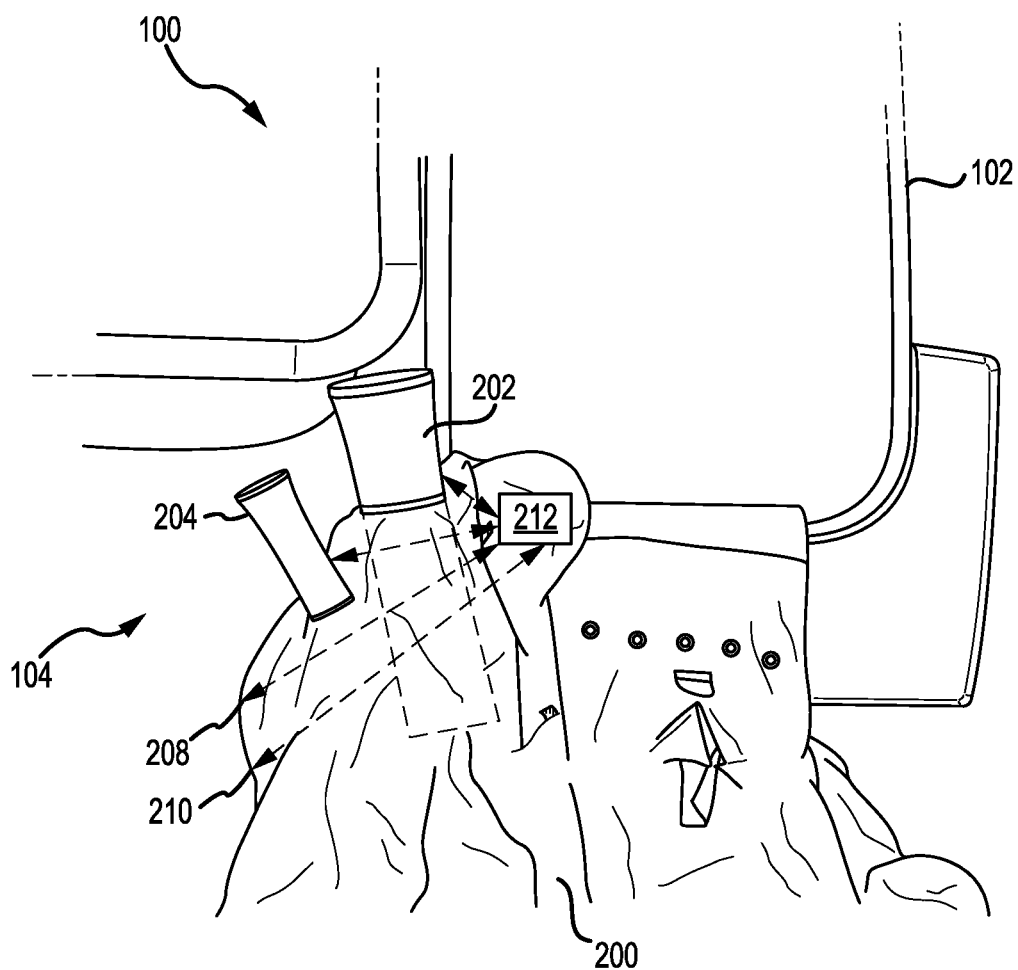
FIG. 2 is a drawing of the evacuation system of FIG. 1 including an inflatable device, in accordance with various embodiments.

Turning to FIG. 2, additional details of the evacuation system 104 are illustrated. In particular, the evacuation system 104 includes an inflatable device 200. The evacuation system 104 further includes a ducted fan aspirator 202, a compressor aspirator 204, a controller 208, a pressure sensor 210, and a power source 212. The inflatable device 200 may be coupled to the fuselage 101 of FIG. 1, and may be decoupled from the fuselage 101 in response to being fully inflated or to being manually detached in order to allow passengers and/or crew members to safely float away from the aircraft 100 of FIG. 1. In various embodiments, the inflatable device 200 may be permanently coupled to the fuselage 101. In various embodiments, the inflatable device 200 may function as a slide from the fuselage 101 to a ground surface upon which the aircraft 100 is resting. In various embodiments, the inflatable device 200 may be entirely decoupled from the fuselage 101 at all times, may be removed from a cabin by a passenger or crew member, and may be inflated away from the fuselage.

Details regarding the ducted fan aspirator 202 and the compressor aspirator 204 will be discussed in more detail below. The controller 208 may include one or more processors and one or more tangible, non-transitory memories and be capable of implementing logic. The processor can be a general purpose processor, a digital signal processor (DSP), an application specific integrated circuit (ASIC), a field programmable gate array (FPGA) or other programmable logic device, discrete gate or transistor logic, discrete hardware components, or any combination thereof. The pressure sensor 210 may include any sensor capable of detecting data corresponding to a pressure within the inflatable device 200 (the air within the inflatable device 200 may be referred to as "device air"). The controller 208 may be coupled to the aspirators 202, 204 and may control the aspirators 202, 204. In various embodiments, the controller 208 may further be coupled to the pressure sensor 210, may determine the pressure within the inflatable device 200 based on the detected pressure data, and may control the aspirators 202, 204 based on the determined pressure. The power source 212 may include any power storage device such as one or more of a battery, a flywheel, or a supercapacitor. In various embodiments, the power source 212 may include any power generation device such as a generator. The power source 212 may provide electrical energy to any one or more of the aspirators 202, 204, the controller 208, or the pressure sensor 210 to facilitate operation of these elements.

Figure 3A:
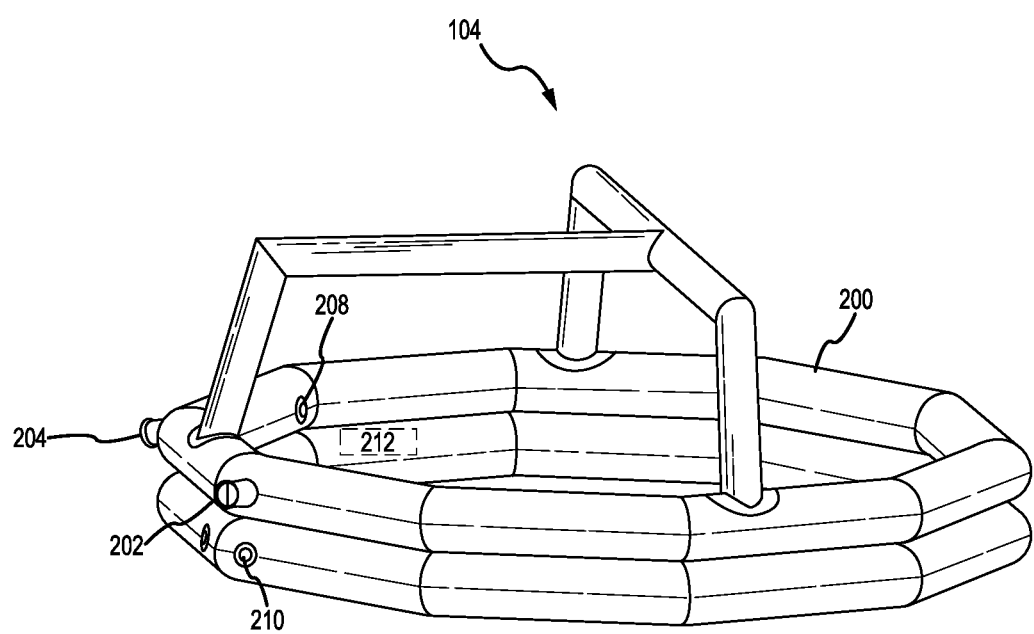
FIG. 3A is a drawing of the inflatable device of FIG. 2 in an inflated configuration, in accordance with various embodiments.

Referring to FIG. 3A, the inflatable device 200 is illustrated as fully inflated and separated from the fuselage 101 of FIG. 1. In particular, the aspirators 202, 204, the controller 208, the pressure sensor 210, and the power source 212 may remain coupled to the inflatable device 200. In various embodiments, one or more of these elements of the evacuation system 104 may become detached from the inflatable device 200 before, during, or after inflation.

Figure 3B:
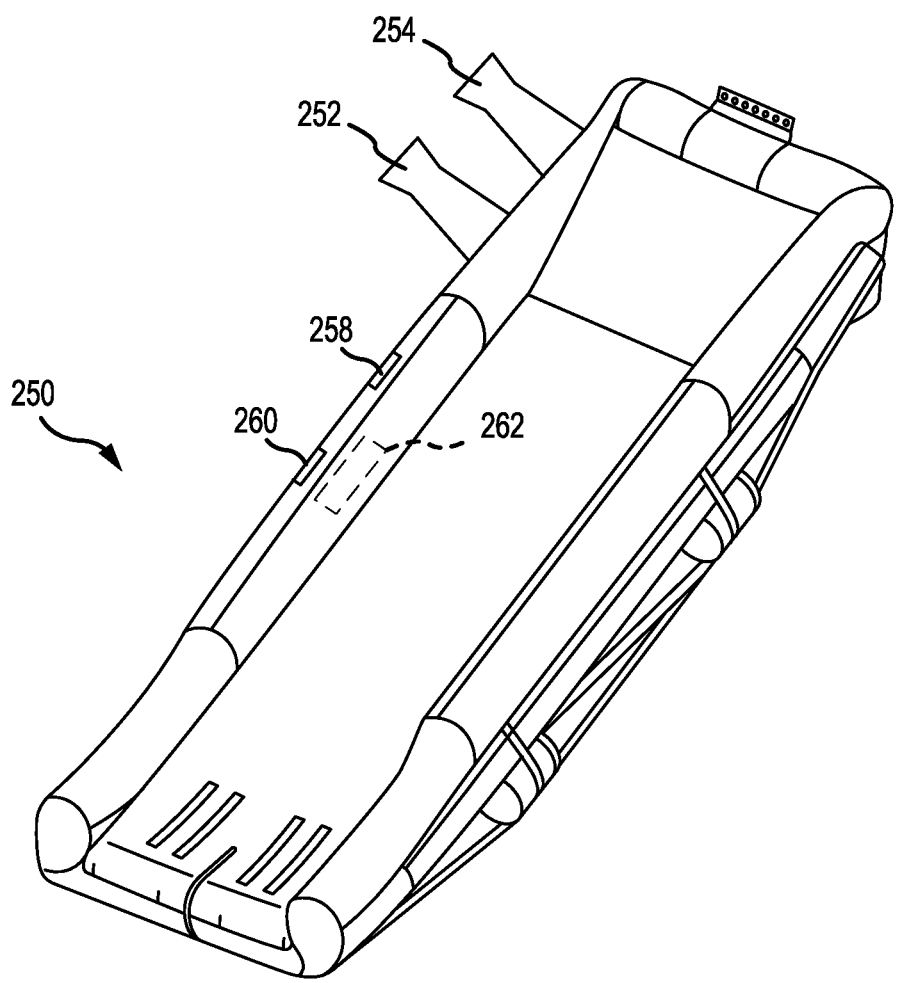
FIG. 3B is a drawing of another inflatable device in an inflated configuration, in accordance with various embodiments.
Figure 4:
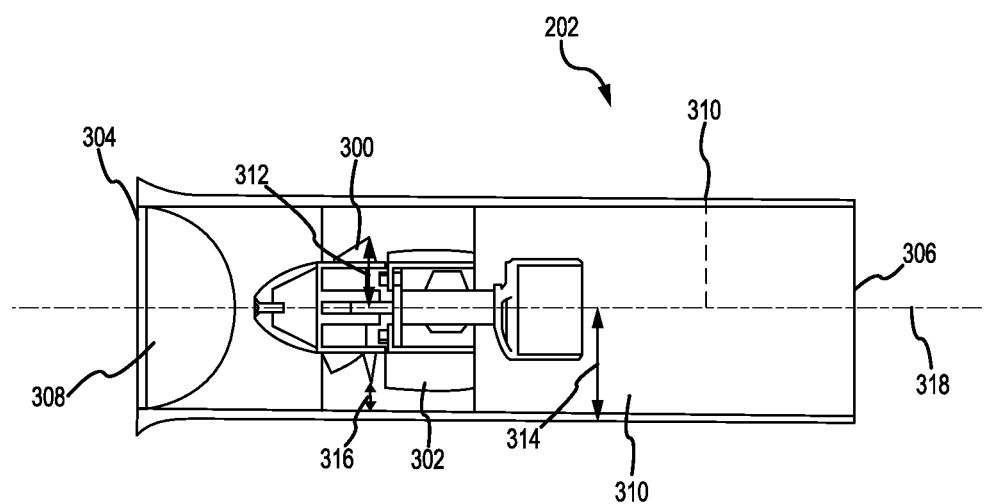
FIG. 4 is a drawing of a ducted fan aspirator of the evacuation system of FIG. 1, in accordance with various embodiments.
Figure 5A:
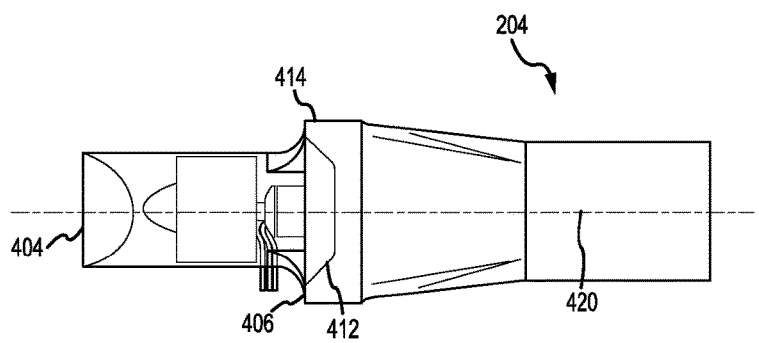
FIGS. 5A, 5B, and 5C are drawings of a compressor aspirator of the evacuation system of FIG. 1, in accordance with various embodiments.
Figure 5B:
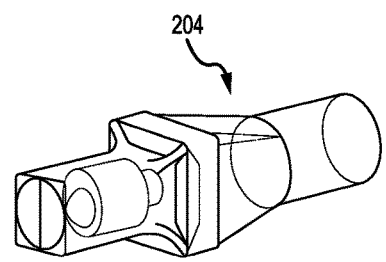
Figure 5C:
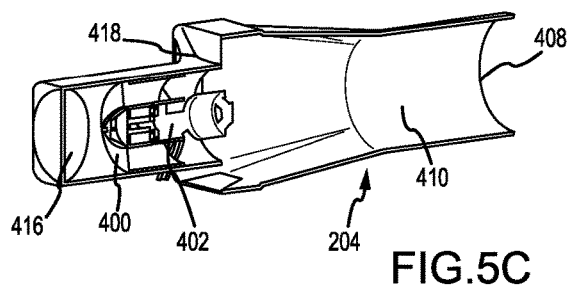

Referring briefly to FIG. 3B, another inflatable device 250 is shown as inflated. The inflatable device 250 may provide egress from an aircraft in various situations. In various embodiments, the inflatable device 250 may include similar features as the inflatable device 200 of FIG. 3A. In that regard, the inflatable device 250 may include a ducted fan aspirator 252 and a compressor aspirator 254. The inflatable device 250 may further include a controller 258, a pressure sensor 260, and a power source 262. The inflatable device 250 may be coupled to a fuselage of an aircraft, and may be decoupled from the fuselage in response to being fully inflated or to being manually detached in order to allow passengers and/or crew members to safely float away from the aircraft. In various embodiments, the inflatable device 250 may be permanently coupled to the fuselage. In various embodiments, the inflatable device 250 may function as a slide from the fuselage to a ground surface upon which the aircraft is resting Referring now to FIGS. 3A and 4, additional details of the ducted fan aspirator 202 are shown. The ducted fan aspirator 202 may include a fan 300 and a fan motor 302 coupled to the fan 300. The fan 300 may include any fan or compressor capable of directing airflow through the ducted fan aspirator 202. The fan motor 302 may receive electrical energy and convert the electrical energy into mechanical power to drive the fan 300.

The ducted fan aspirator 202 may further include a fan inlet 304 and a fan outlet 306. The fan inlet 304 may be located outside of the inflatable device 200 and may receive air from the environment of the inflatable device 200. The airflow through the ducted fan aspirator 202 may flow out of the fan outlet 306. The fan outlet 306 may be at least partially located inside the inflatable device 200 such that the air flowing through the outlet 306 is received inside the inflatable device 200.

The ducted fan aspirator 202 may further include a fan flap 308 located proximate to the fan inlet 304. The fan flap 308 may allow airflow downstream (i.e., from the inlet 304 towards the outlet 306) and may reduce the likelihood of air flowing upstream (i.e., from the outlet 306 to and out through the inlet 304).

The ducted fan aspirator 202 may include a fan channel 310 through which air flows between the fan inlet 304 and the fan outlet 306. In various embodiments, the fan channel 310 may have a channel radial length 314 (i.e., from a longitudinal axis 318 to an outer diameter of the fan channel 310) that remains constant along a length of the ducted fan aspirator 202 and, in various embodiments, the channel radial length 314 may vary along the length of the ducted fan aspirator 202. The fan 300 may have a fan radial length 312 extending from the longitudinal axis 318 to an outer edge of blades of the fan 300. In various embodiments, the channel radial length 314 may be greater than the fan radial length 312 at the location of the fan 300. In that regard, a gap 316 may exist between the outer edge of the fan blades and the outer edge of the fan channel 310. As the fan 300 directs air through the fan channel 310, additional air may flow through the gap 316, thus increasing a total airflow through the ducted fan aspirator 202 beyond that provided solely by the fan 300.

Referring now to FIGS. 3A, 5A, 5B, and 5C, additional details of the compressor aspirator 204 are shown. In particular, the compressor aspirator 204 includes a compressor 400 and a compressor motor 402. The compressor 400 may include any compressor or fan capable of compressing or blowing air through the compressor aspirator 204. The compressor motor 402 may receive electrical energy and convert electrical energy into mechanical power to drive the compressor 400.

The compressor aspirator 204 may be referred to as a mixed flow aspirator as it may direct a primary airflow and a secondary airflow therethrough. In particular, the compressor aspirator 204 includes a primary inlet 404, a secondary inlet 406, an outlet 408, an outlet chamber 410, a primary outlet 412, and a secondary outlet 414. The compressor 400 may drive airflow from the primary inlet 404 towards the primary outlet 412. The compressed airflow through the compressor 400 may result in a negative pressure proximate to the secondary inlet 406, causing air to flow through the secondary inlet 406 and through the secondary outlet 414. The airflow through the primary outlet 412 and the secondary outlet 414 may mix in the outlet chamber 410 and be output via the outlet 408. The primary inlet 404 and the secondary inlet 406 may each be located outside of the inflatable device 200, and the outlet 408 may be located at least partially inside the inflatable device 200. In that regard, the air may flow into the compressor aspirator 204 at the inlets 404, 406 and may flow into the inflatable device 200 from the outlet 408.

The compressor aspirator 204 may further include one or more primary flap 416 located proximate to the primary inlet 404, and one or more secondary flap 418 located proximate to the secondary inlet 406. The primary flap 416 may allow air to flow downstream (i.e., from the primary inlet 404 towards the primary outlet 412) and may reduce the likelihood of air flowing upstream (i.e., from the primary outlet 412 towards and out through the primary inlet 404). The secondary flap 418 may allow air to flow downstream (i.e., from the secondary inlet 406 towards the secondary outlet 414), and may reduce the likelihood of air flowing upstream (i.e., from the secondary outlet 414 towards and out through the secondary inlet 406).

The compressor aspirator 204 may have a longitudinal axis 420. In various embodiments, the primary inlet 404 and the secondary inlet 406 may each be centered along the longitudinal axis 420. In various embodiments, the secondary inlet 406 may be located radially outward from the primary inlet 404 relative to the longitudinal axis 420.

Figure 6:
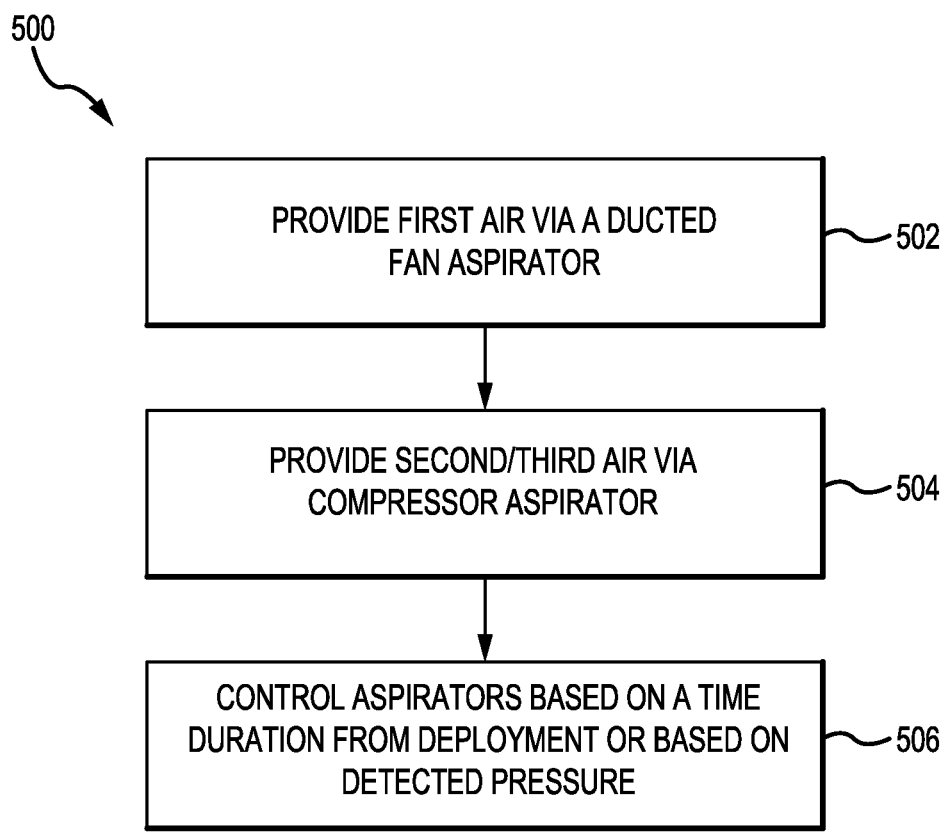
FIG. 6 is a flowchart illustrating a method for controlling aspirators of an evacuation system similar to the evacuation system of FIG. 1, in accordance with various embodiments.

Referring now to FIGS. 2 and 3A and as referenced above, the controller 208 may control operation of the ducted fan aspirator 202 and the compressor aspirator 204, for example, based on data detected by the pressure sensor 210. Turning to FIGS. 2, 3A, and 6, a method 500 may be used by a controller (e.g., the controller 208) to control an evacuation system similar to the evacuation system 104.

In block 502, first air may be provided via a ducted fan aspirator similar to the ducted fan aspirator 202. The first air may be provided during a first time period between a first start time and a first end time. In block 504, second and third air may be provided by a compressor aspirator similar to the compressor aspirator 204. The second and third air may be provided by a primary and secondary inlet, respectively, of the compressor aspirator. The second and third air may be provided during a second time period between a second start time and a second end time. The second time period may be temporally spaced from the first time period. In various embodiments, the second time period may begin at or after the first end time and, in various embodiments, the second time period may begin before the first end time. In various embodiments, the first start time may be before the second start time, and the first end time may be before the second end time.

In various embodiments, it may be desirable for the first time period to run from deployment of the evacuation system until the inflatable device is fully unfolded, and for the second time period to run from a time at which the inflatable device is fully unfolded until the inflatable device is fully inflated. This is because the ducted fan aspirator may provide greater airflow at relatively low pressures compared to the compressor aspirator and because the compressor aspirator may provide greater airflow at relatively great pressures compared to the ducted fan aspirator. In that regard, the dual aspirator evacuation system may facilitate reduced weight, reduced inflation times, and reduced energy storage and power consumption requirements relative to a single aspirator evacuation system.

Referring to FIGS. 2, 3A, and 6 and in various embodiments, control of the compressor aspirator and the ducted fan aspirator may be performed based on an elapsed time since deployment of the evacuation system and may be controlled by a controller or by another means (e.g., timers located at the aspirators or respective motors). In various embodiments, control of the aspirators may be performed based on detected pressure data within the inflatable device. In various embodiments, the aspirators may be controlled independent of a controller based on elapsed times from deployment of the evacuation system.

In that regard and in block 506, a controller may control the aspirators based on a time duration from deployment of the evacuation system. For example, the controller may be aware of a duration of the first time period and of the second time period. In response to deployment, the controller may control the ducted fan aspirator to direct the first airflow into the inflatable device for the first time period. In response to expiration of the first time period, the controller may control the ducted fan aspirator to cease directing the air and may control the compressor aspirator to direct the second and third airflow into the inflatable device for the second time period.

As another example, the controller may be programmed with a specific pressure at which the advantages of the compressor aspirator outweigh the ducted fan aspirator. In that regard, the controller may control the ducted fan aspirator to direct the first air into the inflatable device until the pressure reaches the programmed specific pressure, and may control the compressor aspirator to direct the second and third air into the inflatable device starting in response to the detected pressure being equal to or greater than the programmed specific pressure and until the pressure reaches a fully inflated pressure.

By way of example, table 1 below illustrates power, energy, and weight savings for a dual aspirator system compared to a single aspirator system that includes only a compressor aspirator. A first row illustrates the power consumption, energy storage, and weight requirements of a specific single aspirator system for a specific aircraft. A second row illustrates the power consumption, energy storage, and weight requirements of a dual aspirator system for the same specific aircraft. A third row illustrates a percentage reduction in each of the power consumption, energy storage, and weight requirements afforded by the dual aspirator system. As shown, the dual aspirator system provides significant advantages relative to the single aspirator system.

| MIXED FLOW COMPRESSOR | POWER REQUIREMENT (kW) | ENERGY REQUIREMENT (Wh) | TOTAL WEIGHT (kg) |
|---|---|---|---|
| MIXED FLOW COMPRESSOR | 7.65 | 32 | 1.69 |
| DUAL SYSTEM | 3.52 | 5.49 | 0.728 |
| REDUCTION (%) | 54 | 82 | 57 |

Benefits, other advantages, and solutions to problems have been described herein with regard to specific embodiments. Furthermore, the connecting lines shown in the various figures contained herein are intended to represent exemplary functional relationships and/or physical couplings between the various elements. It should be noted that many alternative or additional functional relationships or physical connections may be present in a practical system. However, the benefits, advantages, solutions to problems, and any elements that may cause any benefit, advantage, or solution to occur or become more pronounced are not to be construed as critical, required, or essential features or elements of the disclosure. The scope of the disclosure is accordingly to be limited by nothing other than the appended claims, in which reference to an element in the singular is not intended to mean "one and only one" unless explicitly so stated, but rather "one or more." Moreover, where a phrase similar to "at least one of A, B, or C" is used in the claims, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C. Different cross-hatching is used throughout the figures to denote different parts but not necessarily to denote the same or different materials.

Systems, methods and apparatus are provided herein. Throughout the present disclosure, like references numbers may denote like elements. Accordingly, elements with element numbering may be shown in the figures, but may not necessarily be repeated herein for the sake of clarity. In the detailed description herein, references to "one embodiment", "an embodiment", "an example embodiment", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described. After reading the description, it will be apparent to one skilled in the relevant art(s) how to implement the disclosure in alternative embodiments.

Furthermore, no element, component, or method step in the present disclosure is intended to be dedicated to the public regardless of whether the element, component, or method step is explicitly recited in the claims. No claim element herein is to be construed under the provisions of 35 U.S.C. 112 (f) unless the element is expressly recited using the phrase "means for." As used herein, the terms "comprises", "comprising", or any other variation thereof, are intended to cover a non-exclusive inclusion, such that a process, method, article, or apparatus that comprises a list of elements does not include only those elements but may include other elements not expressly listed or inherent to such process, method, article, or apparatus.

What is claimed is:

1. A system for inflating an inflatable device, the system comprising:
   a ducted fan aspirator coupled to the inflatable device and having a fan and a fan motor configured to drive the fan to direct first air into the inflatable device;
   a compressor aspirator coupled to the inflatable device and having a compressor and a compressor motor configured to drive the compressor to direct second air into the inflatable device, wherein the compressor aspirator includes a primary inlet through which the second air flows into the compressor aspirator and a secondary inlet configured to facilitate flow of a third air into the inflatable device in response to the compressor directing the second air into the inflatable device, wherein the ducted fan aspirator is configured to direct the first air into the inflatable device during a first time period from a first start time to a first end time, and wherein the compressor aspirator is configured to direct the second air into the inflatable device during a second time period from a second start time that is later than the first start time to a second end time that is later than the first end time; and
   a controller coupled to the ducted fan aspirator and to the compressor aspirator and configured to control the fan to direct the first air into the inflatable device during the first time period and to control the compressor to direct the second air into the inflatable device during the second time period.

2. The system of claim 1, wherein the compressor aspirator further includes:
   a primary flap located proximate to the primary inlet and configured to reduce the likelihood of the second air flowing upstream through the primary inlet; and
   a secondary flap located proximate to the secondary inlet and configured to reduce the likelihood of the third air flowing upstream through the secondary inlet.

3. The system of claim 2, wherein the compressor aspirator has a longitudinal axis, and the primary inlet is located radially inward relative to the secondary inlet.

4. The system of claim 2, wherein the compressor aspirator further includes:
   an outlet through which the second air and the third air flow out of the compressor aspirator and into the inflatable device;
   an outlet chamber in which the second air and the third air mix;
   a primary outlet downstream from the compressor through which the second air enters the outlet chamber; and
   a secondary outlet downstream from the secondary inlet through which the third air enters the outlet chamber.

5. The system of claim 1, wherein the ducted fan aspirator further includes:
   a fan inlet through which the first air flows into the ducted fan aspirator;
   a fan flap located proximate to the fan inlet and configured to reduce the likelihood of the first air flowing upstream through the fan inlet;
   a fan outlet downstream from the fan through which the first air flows out of the ducted fan aspirator; and
   a fan channel extending from the fan inlet to the fan outlet.

6. The system of claim 5, wherein:
   the ducted fan aspirator has a longitudinal axis;
   the fan is centered along the longitudinal axis; and
   the fan has a fan radial length that is less than a channel radial length of the fan channel.

7. The system of claim 1, wherein the controller is further configured to control the fan and the compressor based on an elapsed amount of time since the first start time.

8. The system of claim 1, further comprising a pressure sensor configured to detect a pressure of device air in the inflatable device, wherein the controller is further configured to control the fan and the compressor based on the pressure of the device air in the inflatable device.

9. A system for inflating an inflatable device, the system comprising:
   a ducted fan aspirator coupled to the inflatable device and having a fan and a fan motor configured to drive the fan to direct first air into the inflatable device during a first time period;
   a compressor aspirator coupled to the inflatable device and having:
      a compressor and a compressor motor configured to drive the compressor to direct second air into the inflatable device via a primary inlet during a second time period that is different than the first time period, and
      a secondary inlet configured to facilitate flow of a third air into the inflatable device in response to the compressor directing the second air into the inflatable device during the second time period; and
   a controller coupled to the ducted fan aspirator and to the compressor aspirator and configured to control the fan to direct the first air into the inflatable device during the first time period and to control the compressor to direct the second air into the inflatable device during the second time period.

10. The system of claim 9, wherein the compressor aspirator further includes:
    a primary flap located proximate to the primary inlet and configured to reduce the likelihood of the second air flowing upstream through the primary inlet; and a secondary flap located proximate to the secondary inlet and configured to reduce the likelihood of the third air flowing upstream through the secondary inlet.

11. The system of claim 10, wherein the ducted fan aspirator further includes:
- a fan inlet through which the first air flows into the ducted fan aspirator;
- a fan flap located proximate to the fan inlet and configured to reduce the likelihood of the first air flowing upstream through the fan inlet;
- a fan outlet downstream from the fan through which the first air flows out of the ducted fan aspirator; and
- a fan channel extending from the fan inlet to the fan outlet.

12. A method for inflating an inflatable device, the method comprising:
- providing, by a ducted fan aspirator, first air into the inflatable device during a first time period from a first start time to a first end time; and
- providing, by a compressor aspirator, second air into the inflatable device during a second time period from a second start time to a second end time, wherein the second start time is later than the first start time, and the second end time is later than the first end time.

13. The method of claim 12, further comprising providing, by the compressor aspirator, third air into the inflatable device during the second time period, the third air flowing through a secondary inlet of the compressor aspirator in response to the second air being provided by the compressor aspirator.

14. The method of claim 12, further comprising controlling, by a controller, the ducted fan aspirator and the compressor aspirator based on an elapsed amount of time since the first start time.

15. The method of claim 12, further comprising:
- detecting, by a pressure sensor, a pressure of device air in the inflatable device; and
- controlling, by a controller, the ducted fan aspirator and the compressor aspirator based on the pressure of the device air.

* * * * *